Jan. 29, 1963   K. W. BRUNETTE ETAL   3,076,130
VOLTAGE REGULATOR
Filed Oct. 4, 1960
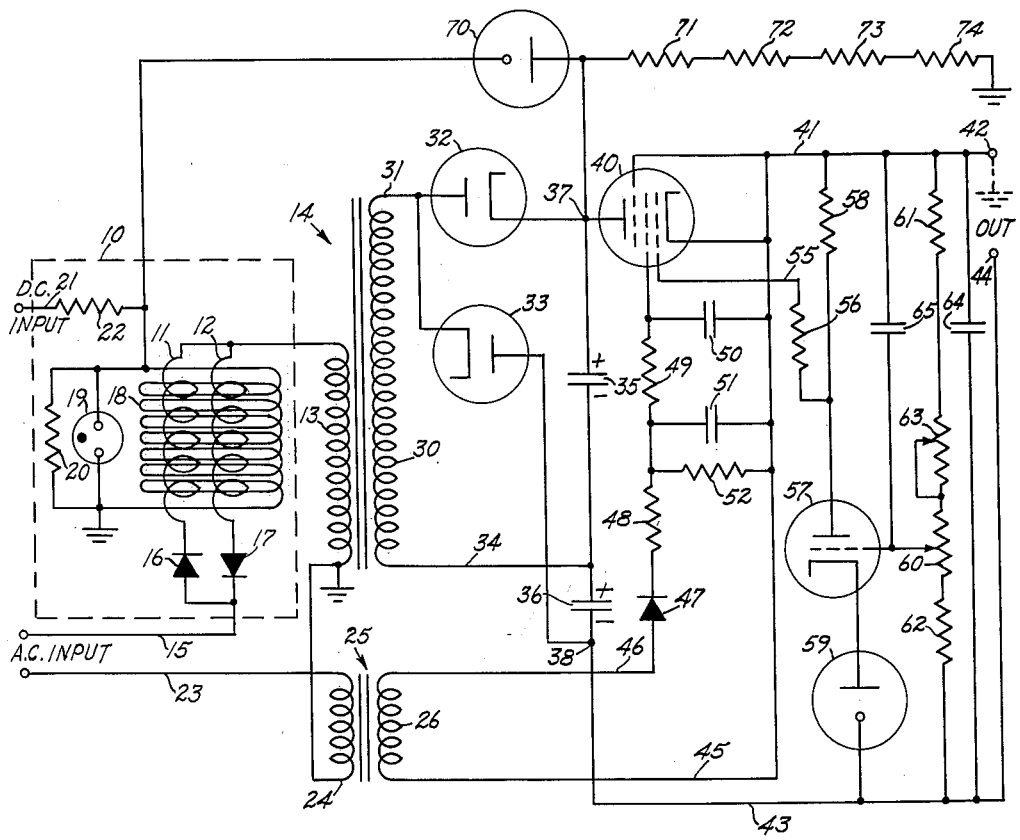
INVENTORS
KENNETH W. BRUNETTE
WALTER L. WUSTER
BY
H. H. Loscke
ATTORNEYS 3,076,130
VOLTAGE REGULATOR
Kenneth W. Brunette and Walter L. Wuster, Indianapolis, Ind., assignors to the United States of America as represented by the Secretary of the Navy
Filed Oct. 4, 1960, Ser. No. 60,528
9 Claims. (Cl. 321—18)
(Granted under Title 35, U.S. Code (1952), sec. 266)

The invention described herein may be manufactured and used by or for the Government of the United States of America for governmental purposes without the payment of any royalties thereon or therefor.

This invention relates to voltage regulators and more particularly to voltage regulators of the type using an alternating current voltage input which is transformed and rectified to a high voltage direct current, regulation being primarily of the high voltage direct current to maintain a substantially constant amplitude direct current output voltage, and secondary regulation being through a corona tube protective circuit to regulate the amplitude of the alternating current input voltage which, at the same time, protects the primary regulator circuit.

In the usual and well-known voltage regulators of the type to utilize alternating current voltage for high voltage direct current outputs, the alternating current voltage is transformed to a desirable high voltage, rectified, and filtered. The high voltage circuit has a series regulator tube in the direct current high voltage output controlling the output voltage in accordance with a predetermined reference voltage. Such voltage regulators are reliable to the point where high peak transient voltages are applied to the incoming voltage circuit which often times disable the series regulator tube causing failure of the regulator circuit.

In the present invention a high voltage regulator circuit is protected against transient voltages occurring on the input alternating current supply source or resulting from the load circuit to prevent failure of the voltage regulating network. In this invention the alternating current input is applied through a self-saturating magnetic amplifier of the type known as an amplistat which gates the alternating current voltage through two gating windings coupled in common through a high voltage transformer. The gating windings are coupled to the alternating current voltage source through oppositely polarized rectifiers or diodes and the impedance of the gating windings is controlled by an impedance control winding wound around the two gating windings and insulated therefrom. The secondary of the high voltage transformer is coupled through a voltage doubler circuit the output of which is through a series regulator tube controlling conduction of the high voltage to an output load. A sample of the output voltage is applied through a triode control tube producing a bias on the series regulator tube to control conduction thereby regulating the high voltage direct current to a load output. A corona tube is coupled in series with the impedance control winding of the amplistat and a point on the output circuit between the voltage doubler and the series regulator tube to conduct during the presence of excessively high transient voltages to increase the impedance in the amplistat and thereby reduce the amplitude of alternating current applied in the primary of the high voltage transformer. By this construction voltage regulation is primarily carried out by the series regulator tube circuit and voltage regulation is secondarily carried out by control of the impedance circuit in the amplistat controlling the amplitude of the input alternating current voltage which latter circuit protects the series regulator tube control circuit as well. It is therefore a general object of this invention to provide a voltage regulator of the type transforming alternating current voltage to a high direct current voltage through an amplistat input having an impedance control circuit therein and a series voltage regulator tube in the direct current output wherein primary voltage regulation is carried out in the control of the series regulator tube and secondary voltage regulation and protection of the primary voltage regulation circuit is carried out by a corona tube circuit coupled to control the impedance control winding of the amplistat.

This general object and other objects, advantages, as well as the uses and features of this invention will become more apparent to those skilled in the art as the description proceeds when considered along with the figure of drawing illustrating a preferred emodiment in circuit schematic diagram.

Referring more particularly to the FIGURE of drawing, there is illustrated a self-saturating magnetic amplifier 10 which may be of the type known as an amplistat, or the like, having two gating windings 11 and 12 coupled in common through the primary winding 13 of a high voltage transformer 14 to ground. Gating windings 11 and 12 are each coupled to one lead 15 of an alternating current input voltage source through diodes 16 and 17, respectively. The amplistat includes an impedance control winding 18 that is wound around both the gating windings 11 and 12, the gating windings 11 and 12 and the impedance control winding 18 being electrically insulated from each other. The impedance control winding 18 is coupled to ground and has a neon tube 19 and a damping resistor 20 coupled in parallel therewith. The impedance control winding is biased from a direct current voltage source by way of a conductor means 21 through a fixed resistance 22 to provide a fixed bias on the amplistat sufficiently high to maintain the amplistat in a stable hysteresis range. Neon tube 19 is coupled in parallel with the impedance control winding 18 to protect this control winding from high peak transient voltages by producing, upon conduction, a conductor directly to ground, and the damping resistor 20 is used to dampen out voltage oscillations resulting from the voltage transients. The other conductor 23 of the alternating current voltage input is coupled through the primary winding 24 of a transformer 25 to a ground or fixed potential. Upon the application of an alternating current voltage to the input leads 15 and 23, alternating currents will be induced in the primary winding 13 in accordance with gated currents by the gating circuits 11, 16 and 12, 17.

The secondary winding of the high voltage transformer 30 has one lead 31 coupled in common to the anode of a diode 32 and the cathode of a diode 33 and the other lead 34 coupled to a common junction of capacitors 35 and 36. The cathode of the diode 32 is coupled to the plate of the capacitor 35 opposite to the common junction of capacitors 35 and 36, and the anode of the diode 33 is coupled to the plate of capacitor 36 opposite the common coupling of capacitors 35 and 36. The diodes 32 and 33 and the capacitors 35 and 36 coupled as shown and described herein provide a voltage doubling circuit of a type well understood by those skilled in the art. As is well understood, the voltage induced in the secondary 30 of the high voltage transformer 14 is rectified by the diodes 32 and 33 to produce a direct current voltage across the two capacitors 35 and 36 at the terminals 37 and 38 substantially double the amplitude of the alternating current voltage.

The output terminal 37 of the voltage doubler circuit is coupled to the anode of a series regulator tube 40 and the common coupling of the cathode and suppressor grid is coupled to the output conductor 41 being directly coupled to an output terminal 42 of the voltage regulator circuit. The other output terminal 38 of the voltage doubler circuit is coupled through a conductor 43 to the output terminal 44. The secondary 26 of the transformer 25 has one lead 45 coupled directly to the cathode of the series regulator tube 40 and consequently to the output conductor 41. The other lead from the secondary 26 of transformer 25 is coupled through a rectifying diode 47 and resistors 48 and 49 to the screen grid of the series regulator tube 40 establishing a grid-to-cathode bias on this tube. Capacitors 50 and 51 and resistance 49 are coupled to the biasing conductors 45 and 46 to filter the biasing circuit as is well understood by those skilled in the art. The resistance 48 acts as a surge suppressor and limits the peak current in diode 47. Resistance 52 operates as a screen grid bleeder. The output voltage at terminals 42 and 44 coming by way of the conductors 41 and 43 will be in accordance with the rate of conduction of the series regulator tube 40.

Conduction of the series regulator tube 40 is under the control of the control grid thereof which is coupled by way of the conductor means 55 and a resistance 56 to the anode of a triode control tube 57. The anode of the triode control tube 57 is supplied anode voltage from the output conductor 41 through an anode resistor 58 and the cathode of this tube is coupled through a voltage regulator tube 59 to the conductor 43. The grid of the triode control tube 57 is coupled to a movable tap of a potentiometer 60, this potentiometer being in series with resistances 61 and 62 and a variable resistance 63 coupled across the output leads 41 and 43. In parallel with resistances 60 to 63, inclusive, is a smoothing capacitor 64. The grid of the triode control tube 57 is also coupled through a capacitor 65 to the output conductor 41 to filter or smooth any alternating currents. The variable resistance 63 and the potentiometer 60 provide rough and fine output voltage adjustments, respectively, of the voltage regulator circuit. The voltage from the output conductor 41 is substantially constant or fixed while the voltage on the output conductor 43 is a high negative potential and may tend to vary in accordance with changes in input voltage on the input conductors 15 and 23 or by changes in load demand. Adjustment of the variable resistance 63 and the potentiometer 60 will establish the high negative voltage output at terminals 42 and 44, as, for example, —10,000 volts which may be varied by 63 and 60, for example, from —8.5 kilovolts to —11.5 kilovolts. With the circuit formed as thus far described, the sample voltage established at the movable contact at potentiometer 60 will control conduction of the triode control tube 57 to establish an anode voltage by the voltage drop across the anode resistor 58 and this anode voltage is applied to the control grid of the series regulator tube 40 controlling the conduction thereof to maintain the output voltage at terminals 42 and 44 at a substantially constant direct current amplitude chosen by adjustment of 60 and 63. Input voltage variations and load current demands will cause the control grid of the series regulator tube 40 to vary to maintain the output voltage constant.

In order to protect the series regulator tube, as well as the gating windings 11 and 12 and their respective diodes 16 and 17 from transient high peak voltages, a corona tube 70 is serially coupled between the anode of the series regulator tube 40 and the impedance control winding 18 of the amplistat 10. The anode of the corona tube 70 is coupled to the terminal 37 and the cathode of the corona tube 70 is coupled to the impedance control winding 18 of the amplistat 10 in the circuit established by the polarity as heretofore shown and described. The anode of the corona tube 70 is also coupled through a series of resistances 71, 72, 73, and 74 to ground across which a voltage is developed by the output of the voltage doubler circuit. Four resistances are used since the high voltage applied to them can be divided to come within the voltage ratings of commercial resistances. A lesser number of resistors may be coupled to the anode of the corona tube 70, where desired, but the voltage ratings of these resistances must be sufficient to meet the voltage requirements applied. Whenever the voltage at 37 rises to a point endangering destruction or impairment of the series regulator tube 40, the corona tube 70 will conduct establishing a current flow through the impedance control winding 18 of amplistat 10 to increase the impedance of the alternating current voltage to the primary 13 of high voltage transformer 14. If the input voltage at the amplistat 10 becomes high peaked, conduction will take place through the neon protector tube 19 directly to ground and these surges will be dampened by the damping resistance 20.

In the operation of this regulator circuit let it be assumed, for the purpose of example, that the alternating current input leads 15 and 23 are coupled to a 115 volt supply that may be expected to vary from 108 to 121 volts and to have transient peaks. The gating networks 11, 16 and 12, 17 will gate the alternating current voltage through the primary 13 of transformer 14 as well as the primary 24 of the transformer 25. A direct current input voltage may likewise be applied to the input conductor 21 of the order 200 to 250 volts to establish a bias control current in the impedance control winding 18 to cause the amplistat 10 to operate in a good hysteresis range. The alternating current induced in the secondary 30 of the high voltage transformer 14 will be rectified in the diodes 32 and 33 and the voltage doubled across the capacitors 35 and 36 on the terminals 37 and 38. As shown and described for this circuit the upper plates of both the capacitors 35 and 36 will be positive and the lower plates negative whereby the terminal 37 will be positive with respect to terminal 38. The series regulator tube is normally conducting in accordance with the bias established in the screen grid by the biasing circuit 47 to 52 to supply a direct current voltage to the output terminals 42 and 44. As the voltage across terminals 42 and 44 increases; that is to say, if the voltage on the output conductor 43 becomes more negative with respect to the voltage on the output conductor 41, the control grid bias on the control tube 57 will cause this tube to increase in conduction thereby lowering the anode voltage which, at the same time, lowers the control grid voltage of the series regulator tube 40. Lowering of the control grid voltage of the series regulator tube 40 reduces conduction through this tube to thereby reduce the voltage to that of the predetermined output voltage on the terminals 42 and 44. This change of the voltage across the output terminals 42 and 44 can be caused either by a decrease in load demands coupled to these terminals or by an increase in the alternating current input voltages through the conductors 15 and 23 to induce alternating current voltage changes in the secondary of transformer 14 thereby causing an increase in the output of the voltage doubler circuit. In either instant, within limitation, the output voltage at the terminals 42 and 44 will be regulated to a substantially stable amplitude by the voltage regulating network just described. If the alternating current input voltage coming by way of terminals 15 and 23 rises an excessive amount or has high transient peaks thereon, this higher voltage will be reflected across the transformer 14 and on the output terminals of the voltage doubler circuits 37 and 38. As an example, if the series regulator tube 40 has a maximum anode-to-cathode voltage limitation of about 3,000 volts, the corona tube 70 may be chosen to have a threshold voltage of about 2,500 volts whereby the corona tube 70 will conduct at its rated capacity (for example, the 2,500 volts above stated) to maintain the anode voltage of the series regulator tube at the maximum of 2,500 volts. Conduction of the series regulator tube 70 in series with the impedance control winding 18 of the amplistat 10 will impede the alternating current voltages conducted through the gating windings 11 and 12 thereby reducing the amplitude of the alternating current voltage applied through the primary winding 13. If the input alternating current voltage is high peaked, the transient peaks will be conducted directly to ground through the neon protective tube 19. In this manner the voltage regulator circuit has primary regulation by virtue of the series regulator tube 40 and its related control circuitry, and a secondary regulation as well as protective circuitry in the utilization of the corona tube 70 serially coupled between the voltage doubler output to ground through the impedance control winding of the amplistat 10 in the input circuit of the alternating current voltage. This secondary regulating circuit regulates the alternating current input voltage in amplitude within the limitation capable of control by the primary regulating circuit and in this secondary voltage control likewise protects the primary regulating circuitry.

While many modifications and changes may be made in the constructional details and components as shown and described hereinabove without departing from the spirit and scope of this invention, it is to be understood that we desire to be limited in the teaching hereinabove set forth only by the scope of the appended claims.

We claim:

1. A voltage regulator comprising: inductive means for receiving alternating current voltage, said inductive means having an impedance control means therein; a voltage doubling and rectifying means coupled to receive the voltage output of said inductive means; output leads coupled to said voltage doubling and rectifying means; a regulator tube coupled in series in one of said output leads, said regulator tube having a control electrode to control the conduction thereof; means sampling the output voltage from said regulator tube producing a control voltage applied to said regulator tube control electrode to maintain said output voltage substantially constant; and a corona tube coupled in series between said impedance control means of said inductive means and said one of said output conductors between said voltage doubling and rectifying means and said regulator tube for increasing the impedance of said inductive means during excessive voltage periods on said output leads.

2. A voltage regulator as set forth in claim 1 wherein said inductive means is an amplistat having gating windings coupled in common through the primary winding of a high voltage transformer, the secondary of which is coupled to said voltage doubling and rectifying means, and said impedance control means is a winding wound about said gating windings.

3. A voltage regulator as set forth in claim 2 wherein said regulator tube has its anode and cathode serially coupled in said one output lead and its control grid is said control electrode.

4. A voltage regulator as set forth in claim 3 wherein said means sampling the output voltage is a tapped resistance across said output leads, the tap being coupled to the control grid of a triode control tube having an anode resistance coupled to said one output lead, and the anode is coupled to said regulator tube control grid electrode.

5. A voltage regulator comprising: a self-saturating magnetic amplifier having an impedance control winding, an input for receiving alternating current voltage, and an output; a high voltage transformer having a primary winding coupled to said magnetic amplifier output; a voltage doubling and rectifying means coupled to the secondary of said high voltage transformer for doubling and rectifying applied alternating current voltage on output leads thereof; a series regulator tube having the anode and cathode serially coupled in one of said output leads, said tube having a control grid for controlling the conduction thereof; a triode having its anode and cathode and an anode resistor serially coupled in shunt across said output leads from said regulator tube, the control grid thereof being coupled to a voltage proportional to the output voltage on said output leads from said regulator tube, and said anode being coupled to said control grid of said regulator tube to control the conduction thereof in a manner to maintain the output voltage on said output leads substantially constant; and a corona tube serially coupled between the anode of said regulator tube and the impedance control winding of said magnetic amplifier for conducting current produced by voltage of excess amplitude through said impedance control winding to impede alternating current conduction to said high voltage transformer whereby output voltage is regulated substantially constant and said regulator tube is protected against high amplitude voltage.

6. A voltage regulator as set forth in claim 5 wherein said self-saturating magnetic amplifier includes a pair of gating windings coupled in common to said primary winding of the high voltage transformer with the input coupled through oppositely poled rectifiers respectively to said gating windings; and said impedance control winding is wound about said pair of gating windings to control the impedance thereof, said impedance control winding having a discharge tube and a damping resistor in parallel therewith to protect said impedance control winding from high peak transient voltages.

7. In a voltage regulator having a voltage doubler and rectifier circuit coupled through a series regulator tube controlled in conduction by a triode voltage sampling tube to maintain direct current output at a substantially stable amplitude, the invention which comprises: a self-saturating magnetic amplifier adapted to receive alternating current voltage coupled through a high voltage transformer to said voltage doubler and rectifier circuit, said magnetic amplifier having an impedance winding thereon for controlling the impedance of alternating current voltage to said transformer; and a corona tube having its anode and cathode serially coupled between said impedance winding and a point in the coupling of said voltage doubler and rectifier circuit and said regulator tube to conduct currents produced by high transient voltages through said impedance control winding to reduce the voltage induced in said transformer whereby said series regulator tube is protected from transient voltages.

8. In a voltage regulator as set forth in claim 7 wherein said self-saturating magnetic amplifier has two gating windings therein wound within said impedance control winding, said gating windings being coupled to alternating current voltage through oppositely poled rectifiers, respectively.

9. In a voltage regulator as set forth in claim 8 wherein said impedance control winding includes a discharge tube and a damping resistor in parallel therewith to protect said impedance control winding from high peak transient voltages.

References Cited in the file of this patent

UNITED STATES PATENTS

| 2,573,744 | Trucksess | Nov. 6, 1951 |
| 2,577,151 | Potter | Dec. 4, 1951 |
| 2,802,166 | Sanderlin | Aug. 6, 1957 |
| 2,903,640 | Bixby | Sept. 8, 1959 |